May 3, 1927.

R. KAUCH 1,627,097

SEARCHLIGHT RANGE FINDER

Filed Dec. 14, 1922

INVENTOR
Robert Kauch
Robert H. Young ATTORNEY

May 3, 1927.
R. KAUCH
1,627,097
SEARCHLIGHT RANGE FINDER
Filed Dec. 14, 1922
2 Sheets-Sheet 2
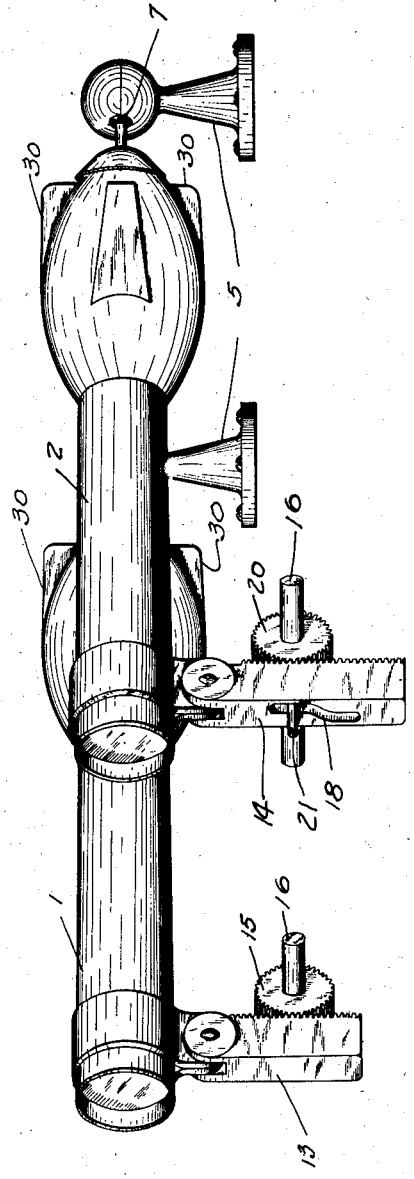
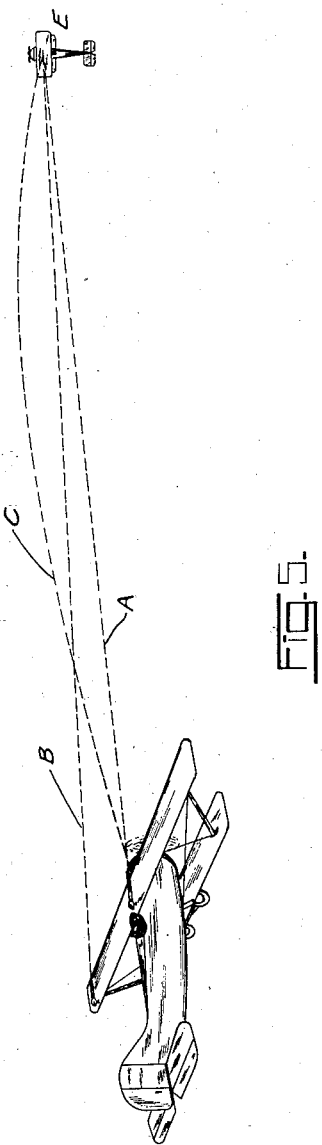
INVENTOR
Robert Kauch
BY
Robert H Young
ATTORNEY Patented May 3, 1927.

1,627,097

UNITED STATES PATENT OFFICE.

ROBERT KAUCH, OF DAYTON, OHIO.

SEARCHLIGHT RANGE FINDER.

Application filed December 14, 1922. Serial No. 607,003.

This invention relates in general to range finders and more particularly to a range finder which utilizes the angle of convergence of two searchlights mounted at a fixed distance apart, for automatically indicating the range of the target upon which the rays of the searchlights are directed.

It is the prime object of my invention to provide means for causing the rays of two searchlights, mounted a fixed distance apart, to converge and means for automatically indicating the range thus given.

Other objects of my invention will appear in the accompanying specification and claims and will be revealed in the following specification and disclosed in the accompanying drawings, in which:

Fig. 2 is a perspective of the device as shown in Fig. 1.

Fig. 5 is a digrammatic view illustrating the mode of operation.

Figure 1:
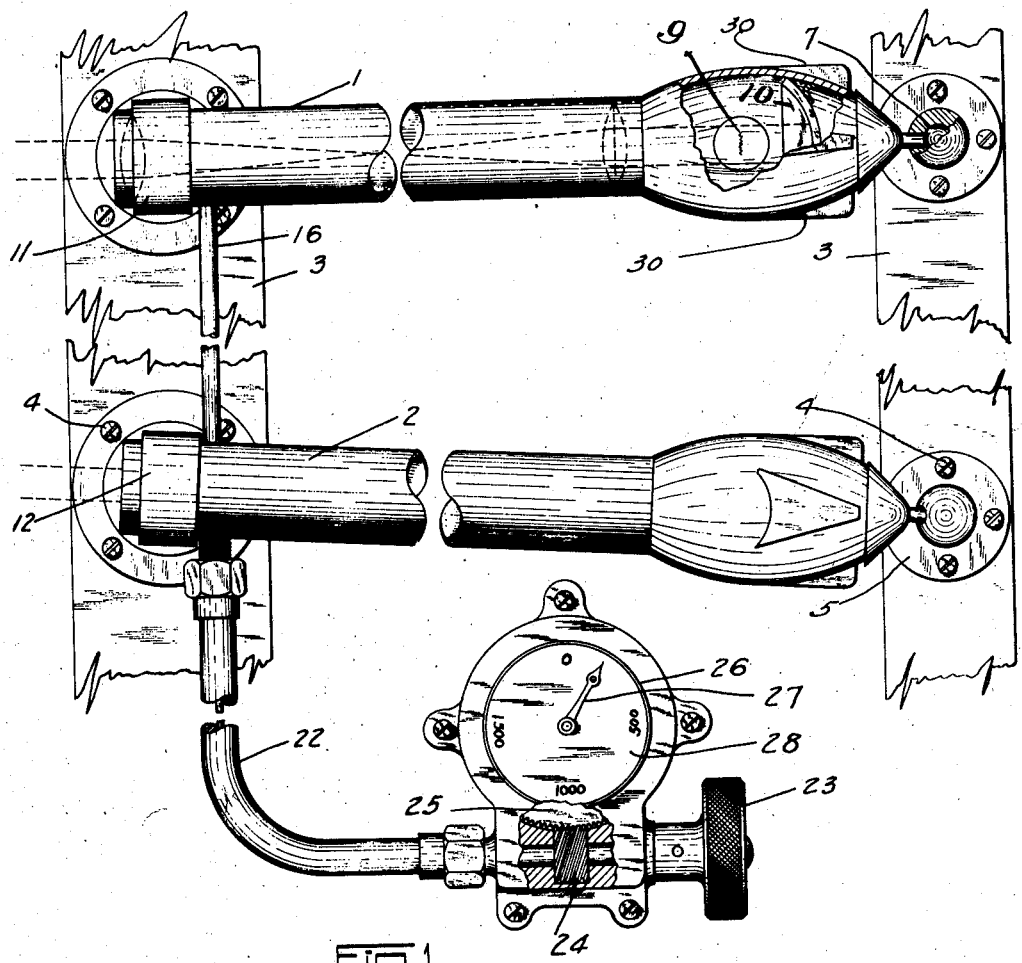
Fig. 1 is a top view of my device, with a portion broken away for clarity.
Figure 3:
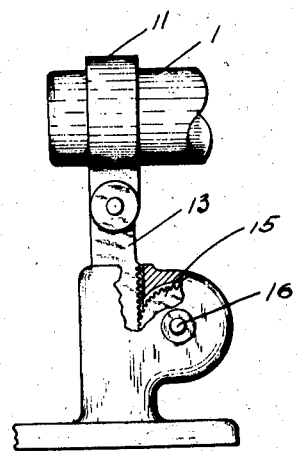
Fig. 3 is an enlarged detail of the elevating device of my stationary searchlight.
Figure 4:
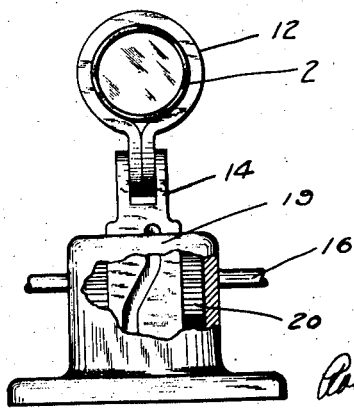
Fig. 4 is an enlarged detail of the elevating and translating device for my movable searchlight with a portion broken away for clarity.

Referring with greater particularity to the drawings, it will be seen that I have mounted a stationary searchlight telescope 1 and a movable searchlight telescope 2 containing searchlight lamps 9 and reflectors 10 upon a suitable support 3 and a longéron of an aircraft or any similar structure of a tank, motor vehicle, ship, or whatever device in connection with which my invention is to be used. Suitable screws 4 are provided to rigidly secure the frames 5 of a suitable ball and socket mounting means to provide for a mounting for and a limited motion of the searchlight.

The balls 7 on the searchlight telescopes 1 and 2 are mounted in said mounting means. The front ends of the telescopes are provided with yokes 11 and 12 to which are pivotally connected the racks 13 and 14 respectively. Rack 13 is of simple structure and is adapted to mesh with a pinion 15 mounted in a combined rack guide and pinion casing. The pinion 15 is fixed on a shaft 16 and adapted to be rotated thereby.

Rack 14 is provided with a longitudinally extending cam slot 18, the surfaces of which are proportioned to give the translatory effect desired. The rack 14 is suitably mounted in a combined rack guide and pinion casing 19 of sufficient width to permit a limited degree of lateral motion of the rack. The rack is adapted to be actuated vertically by a pinion 20 and is adapted to have lateral motion imparted to it by the travel of the cam slot in the rack over a pin 21 which is fixedly secured in the combined guide racks and pinion casing 19.

The pinions 15 and 20 are both fixedly mounted on a shaft 16 which is adapted to be rotated through the medium of a flexible shaft 22. A knurled hand knob 23 is provided and its rotation serves to rotate a worm shaft 24 which meshes with a gear 25 of a range indicator 26, having indicating hand 27 and range indicating dial 28 suitably calibrated. The rotation of worm shaft 24 also rotates the flexible shaft 22 with which it is connected.

In the diagram shown in Fig. 5 the arrangement of my device as applied to aircraft is shown. The fixed searchlight is mounted on the center section of the plane D and the movable searchlight near the tip of a wing.

A indicates the path of the ray of light from the stationary searchlight, B the ray from the movable searchlight and C the path of the projectile toward the hostile plane E.

The slot 18 in the rack 14 is so designed and the dial so calibrated that the rays of light A and B will converge at the range indicated on the dial.

From the foregoing description my device will be seen to operate as follows: When in position to fire, the searchlight 1 will point directly at the target. The pilot will then rotate the hand knob 23 which will move the racks 13 and 14 vertically and simultaneously and through the medium of the pin 21 riding through cam slot 18 the rack 14 moves its searchlight to such a position that its ray of light B converges with ray A on the target. The movement of the knob 23 has operated the indicating means and the range can then be read. The search lights will be substantially parallel at maximum or infinite range and the front ends of the lights will be in their position of maximum elevation. As the range decreases, the laterally movable search light will be moved toward the relatively stationary search light and the front ends of both lights are simultaneously lowered. In order to keep the beam of light from the stationary searchlight on the track when the front end of said light is lowered, it is necessary to correspondingly alter the angle of elevation of the light supporting base. That is to say, in the case of the search lights being mounted on aircraft, the front end of the aircraft must be correspondingly elevated from the horizontal. Then, if the guns to be used on this craft are fixed in relation thereto—and it is primarily for this purpose that this device is designed—the angles of elevation of the guns will be correspondingly raised and the range automatically compensated for. Suitable wind vanes 30 are provided tending to maintain the searchlight telescopes parallel to the line of flight of the aircraft.

It is to be understood that I do not limit my invention to the specific embodiment herein shown but to the broad application of the principles involved.

I claim:

1. In a range finding device, a base, a pair of telescopic searchlights, means mounting said searchlights on the base with their axes coplanar and normally horizontal and for moving said telescopes simultaneously in elevation, and, at the same time, imparting to one of them an angular movement in their common plane, and means connected with the mounting means for indicating the distance at which the searchlight rays intersect.

2. In a range finding device, in combination, a movable base, a pair of telescopic search lights, mountings on said base in connection with said search lights adjacent the rear ends thereof permitting of universal movement of said search lights relatively to said base, a yoke secured to each of said search lights adjacent its forward end, racks pivotally connected to said yokes, rack guide casings fixedly mounted on said base and adapted to receive said racks, a pinion in each of said guide casings adapted to engage said racks, said pinions being fixedly mounted on a common shaft, means for rotating said shaft to operate said pinions and racks to move the front end of said search lights vertically with respect to said base for the purpose described.

3. In a range finding device, a support, a pair of spaced telescopic search-lights, means mounting said search-lights on said base comprising a universal mounting at the rear end and a yoke on the forward end of each light, a rack pivotally connected to each yoke, rack guide casings in which said racks are vertically movable, means for moving said racks in said casings to adjust the front ends of said lights vertically, means associated with one of said racks and casings to laterally adjust the light simultaneously with its vertical movement, and indicating means operated by said last named movement.

4. In a range finding device, in combination, a movable base, a pair of telescopic search lights, mountings on said base in connection with said search lights adjacent the rear ends thereof permitting of universal movement of said search lights relatively to said base, a yoke secured to each of said search lights adjacent its forward end, racks pivotally connected to said yokes, rack guide casings fixedly mounted on said base and adapted to receive said guides, a pinion in each of said guide casings adapted to engage said racks, said pinions being fixedly mounted on a common shaft, means for rotating said shaft to operate said pinions and racks to move the front end of said search lights vertically with respect to said base for the purpose described, and means to simultaneously move one of said search lights angularly with respect to the other of said search lights, said last named means comprising a pin fixed in one of said rack guide casings, and a cam slot in the rack moving in said casing in which cam slot said pin is adapted to travel, whereby vertical motion of said rack produces lateral motion thereof simultaneously.

5. In a range finding device, in combination, a movable base, a pair of telescopic search lights, mountings on said base in connection with said search lights adjacent the rear ends thereof permitting of universal movement of said search lights relatively to said base, a yoke secured to each of said search lights adjacent its forward end, racks pivotally connected to said yokes, rack guide casings fixedly mounted on said base and adapted to receive said guides, a pinion in each of said guide casings adapted to engage said racks, said pinions being fixedly mounted on a common shaft, means for rotating said shaft to operate said pinions and racks to move the front end of said search lights vertically with respect to said base for the purpose described, means to simultaneously move one of said search lights angularly with respect to the other of said search lights, said last-named means comprising a pin fixed in one of said rack guide casings, and a cam slot in the rack moving in said casing in which cam slot said pin is adapted to travel, whereby vertical motion of said rack produces lateral motion thereof simultaneously, and indicating means operated by said last named movement.

6. In a range finding device, a support, a pair of spaced telescopic search-lights, means mounting said search-lights on said base comprising a universal mounting at the rear end and a yoke secured to the forward end of each light, a rack pivotally connected to each yoke, rack guide casings in which said racks are respectively vertically movable, a pinion in each casing adapted to mesh with its rack, a common shaft to which said pinions are secured for rotation thereby, means for rotating the shaft whereby the front ends of the lights may be adjusted vertically, there being means associating one rack with its casing whereby a lateral adjustment is imparted to the light simultaneously with its vertical adjustment.

In testimony whereof I affix my signature.

ROBERT KAUCH.